(No Model.)
J. F. McLAUGHLIN.
ELECTRICAL RAILWAY.
No. 332,927. Patented Dec. 22, 1885.
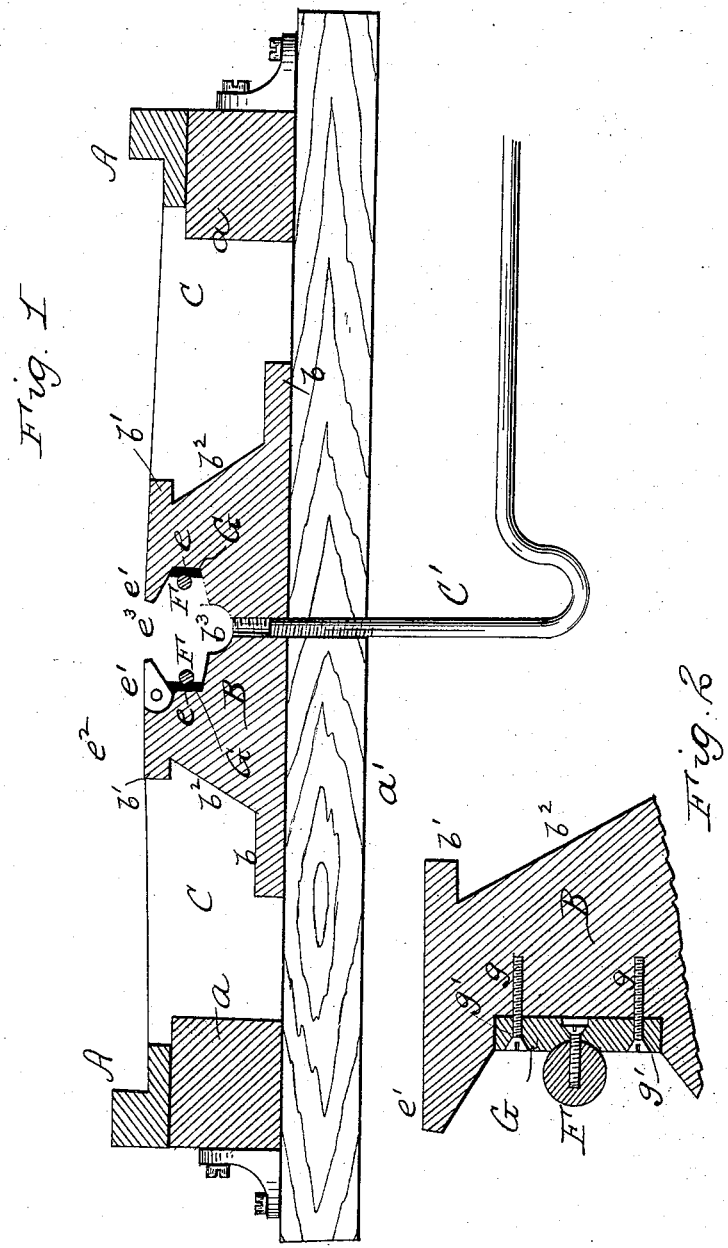
Witnesses:
Wm H. VanHorn
S. S. Clark
Inventor
James F. McLaughlin
By S. J. VanHavoren
Attorney.

UNITED STATES PATENT OFFICE.

JAMES F. McLAUGHLIN, OF PHILADELPHIA, PENNSYLVANIA, ASSIGNOR, BY MESNE ASSIGNMENTS, TO THE NATIONAL ELECTRIC RAILWAY SYSTEM, (LIMITED,) OF SAME PLACE.

ELECTRICAL RAILWAY.

SPECIFICATION forming part of Letters Patent No. 332,927, dated December 22, 1885.

Application filed July 1, 1885. Serial No. 170,330. (No model.)

*To all whom it may concern:*

Be it known that I, JAMES F. McLAUGHLIN, a citizen of the United States, residing in Philadelphia, Pennsylvania, have invented certain Improvements in Electrical Railways, of which the following is a specification.

My invention has more particular reference to the construction of the conduit for carrying the electrical conductors by which the current is supplied to the motors of the moving cars; and the object of my invention is to so construct the conduit that the closing of the slot due to side pressure is avoided. This object I attain by constructing the conduit in the manner which I will now proceed to describe.

In the accompanying drawings, Figure 1 is a transverse section of my improved conduit as laid between the ordinary track-rails; and Fig. 2 is a sectional view, drawn to an enlarged scale, of a part of the conduit.

In Fig. 1, A A represent the ordinary track-rails, which are mounted on the usual longitudinal stringers, $a$, supported by the transverse sleepers or ties $a'$, and centrally between the two rails is laid my improved conduit B, which may be made of cast metal or other suitable material, and which, like the longitudinal stringers, rests and is supported on the cross-ties $a'$, the top of the conduit being about on a level with the track-rails. The space between the conduit and the transverse rails is composed of any suitable material, although I prefer a cement composition. Blocks or cobble-stones, however, may be substituted therefor. The walls of the conduit are made thick, as shown in Fig. 1, and the exteriors of these side walls are inclined, as shown at $b^2$, so that the greatest possible resistance will be offered to side pressure, and the possibility of narrowing the slot $a^3$ thereby reduced to a minimum. To the inner faces of the said walls are secured the insulating-strips G, carrying the conductors F. In this case I have shown the insulating-strips G as being secured by screws $g$, passing through openings $g'$ in the side strips; and I have also shown the conductors F as in the form of a cylindrical wire in cross-section, and secured by a screw passing in from the back of the insulating-strips. I do not limit myself, however, to any special construction or arrangement of the conductors or insulating-strips, and the construction illustrated forms the subject of a separate application filed by me July 1, 1885, Serial No. 170,331. The conductors are protected by the inwardly-projecting lips $e'$ on each side of the slot $e^3$, and, if desired, one or both of these lips may be hinged to the conduit, as shown at $e^2$, to permit ready access to the interior of the conduit for cleansing, repairs, or other purposes. I prefer to provide the outer edges of the conduit with flanges or lips $b\ b'$ at the bottom and top, in order that the conduit may be more firmly secured and held in place by the surrounding material of which the roadway is composed.

A trapped pipe, C', may be employed to carry off water collecting in the conduit.

I claim as my invention—

The herein-described conduit, carrying interior insulated conductors, and having thickened side walls with inclined exterior surfaces, substantially as and for the purpose set forth.

In testimony whereof I affix my signature in presence of two witnesses.

JAMES F. McLAUGHLIN.

Witnesses:
S. J. VAN STAVOREN,
CHAS. F. VAN HORN.